US007353281B2

(12) United States Patent
New, Jr. et al.

(10) Patent No.: US 7,353,281 B2
(45) Date of Patent: Apr. 1, 2008

(54) METHOD AND SYSTEM FOR PROVIDING ACCESS TO COMPUTER RESOURCES

(75) Inventors: John C. New, Jr., Austin, TX (US); Mark T. Price, Maple Grove, MN (US)

(73) Assignee: Micron Technology, Inc., Boise, ID (US)

( * ) Notice: Subject to any disclaimer, the term of this patent is extended or adjusted under 35 U.S.C. 154(b) by 761 days.

(21) Appl. No.: 09/923,663

(22) Filed: Aug. 6, 2001

(65) Prior Publication Data

US 2003/0028653 A1 Feb. 6, 2003

(51) Int. Cl.
G06F 15/16 (2006.01)
(52) U.S. Cl. .............. 709/229; 709/219; 713/185; 713/188; 713/189; 713/190; 713/191; 713/192; 713/193; 717/174; 717/175; 717/172; 717/176; 717/177; 717/178
(58) Field of Classification Search ........ 709/229, 709/219; 713/172, 201, 188–193, 185; 725/1; 717/172, 174–178
See application file for complete search history.

(56) References Cited

U.S. PATENT DOCUMENTS

| 5,761,309 | A | * | 6/1998 | Ohashi et al. ............. 713/156 |
|---|---|---|---|---|
| 5,768,382 | A | * | 6/1998 | Schneier et al. ........... 380/251 |
| 5,850,442 | A | * | 12/1998 | Muftic ........................ 705/65 |
| 6,006,328 | A | * | 12/1999 | Drake ......................... 726/23 |
| 6,173,400 | B1 | * | 1/2001 | Perlman et al. ............ 713/172 |
| 6,175,922 | B1 | * | 1/2001 | Wang ......................... 713/182 |
| 6,270,011 | B1 | * | 8/2001 | Gottfried ................... 235/379 |
| 6,363,488 | B1 | | 3/2002 | Ginter et al. .............. 713/201 |
| 6,438,597 | B1 | | 8/2002 | Mosberger et al. ........ 709/227 |
| 6,449,719 | B1 | * | 9/2002 | Baker ........................ 713/168 |
| 6,523,022 | B1 | | 2/2003 | Hobbs ........................... 707/3 |
| 6,594,692 | B1 | | 7/2003 | Reisman ..................... 709/219 |
| 6,658,568 | B1 | | 12/2003 | Ginter et al. .............. 713/193 |
| 6,662,231 | B1 | | 12/2003 | Drosset et al. ............ 709/229 |
| 6,721,716 | B1 | | 4/2004 | Gross .......................... 705/40 |
| 6,763,370 | B1 | | 7/2004 | Schmeidler et al. ....... 709/203 |
| 6,769,010 | B1 | | 7/2004 | Knapp et al. .............. 709/203 |
| 6,769,127 | B1 | | 7/2004 | Bonomi et al. .............. 725/39 |
| 6,810,525 | B1 | * | 10/2004 | Safadi et al. ................. 725/1 |
| 6,918,113 | B2 | * | 7/2005 | Patel et al. ................. 717/178 |
| 2001/0051996 | A1 | | 12/2001 | Cooper et al. ............. 709/217 |
| 2002/0002538 | A1 | | 1/2002 | Ling ........................... 705/41 |
| 2002/0007321 | A1 | | 1/2002 | Burton ........................ 705/26 |
| 2002/0013944 | A1 | | 1/2002 | Gordon et al. .............. 725/39 |

(Continued)

Primary Examiner—Nathan Flynn
Assistant Examiner—Mohammad Siddiqi
(74) Attorney, Agent, or Firm—Dorsey & Whitney, LLP

(57) ABSTRACT

A method and computer system for providing access to computer resources on a computer system and includes generating a token containing encrypted user information including credit, authorization, and authentication information. A request is initiated to open an encrypted computer resource stored on the computer system, and execution of a remote application manager component on the computer system is also initiated. The remote application manager component decrypts the token and authenticates a user using authentication information stored in the token. Whether the user is authorized and has sufficient credit are then verified. When the user is approved, the requested computer resource is decrypted and opened. Use of the computer resource is monitored to determine whether the user has sufficient credit to continue using the computer resource. A notification is provided when the monitored usage of the opened computer resource has exceeded the credit.

16 Claims, 4 Drawing Sheets

U.S. PATENT DOCUMENTS

| | | |
|---|---|---|
| 2002/0026503 A1 | 2/2002 | Bendinelli et al. ............ 709/220 |
| 2002/0037075 A1 | 3/2002 | Flanagan ................. 379/201.12 |
| 2002/0055878 A1 | 5/2002 | Burton et al. .................. 705/26 |
| 2002/0104019 A1 | 8/2002 | Chatani et al. ............... 713/201 |
| 2002/0112171 A1* | 8/2002 | Ginter et al. ................ 713/185 |
| 2002/0141387 A1 | 10/2002 | Orshan ........................ 370/352 |
| 2002/0188863 A1 | 12/2002 | Friedman ..................... 713/201 |
| 2002/0194140 A1 | 12/2002 | Makuck ......................... 705/67 |
| 2002/0194143 A1 | 12/2002 | Banerjee et al. ............. 705/400 |
| 2003/0028586 A1 | 2/2003 | Barillaud ..................... 709/202 |
| 2003/0236745 A1 | 12/2003 | Hartsell et al. ................ 705/40 |

* cited by examiner

METHOD AND SYSTEM FOR PROVIDING ACCESS TO COMPUTER RESOURCES

TECHNICAL FIELD

The present invention relates generally to computer systems, and more specifically to providing access to computer resources over a computer network such as the Internet.

BACKGROUND OF THE INVENTION

The architecture of computer networks has changed dramatically over the last several decades. In the seventies and early eighties, probably the most prevalent architecture was the mainframe architecture in which a very powerful mainframe computer contained all processing and storage power and users accessed the mainframe via so called "dumb" terminals, which had no processing power and acted merely as user interfaces to the mainframe. The mainframe architecture is prone to system failures because all processing power is located in the powerful mainframe computer, and while the mainframe computer is down no users can access the system. In the eighties, advancements in semiconductor technology enabled significant processing power to be placed on a user's desktop in the form of a personal computer. Consequently, the predominant computer network architecture defaulted into a distributed architecture, with a number of personal computers being interconnected via a communications network, such as a local area network. Under this type of architecture, each personal computer was able to share resources with the other computers, but many resources, such as application programs, were primarily stored and run independently on each personal computer, due, in part, to bandwidth limitations of communicating over the network.

In today's computing environment, the Internet forms part of a Global Communications Network that interconnects millions of computers via the client-server network architecture. In the client-server architecture, servers are powerful computers dedicated to managing network resources, and clients are personal computers or workstations that run application programs and rely on servers for computer resources such as files and even processing power. The client-server architecture has become a viable network architecture due in part to the dramatically increased bandwidth provided by the communications infrastructure forming the backbone of the Internet, as will be appreciated by those skilled in the art. The distributed processing power between the client and server systems has led to a myriad of third parties that provide software services to a number of users over the Internet or other wide area network. These third parties are known as Application Service Providers ("ASPs") and they allow users to access software services provided by the ASPs by accessing a server maintained by the ASP over a suitable communications network. FIG. 1 is a functional block diagram illustrating a conventional ASP system 100 including a client computer system 102 that accesses an ASP server computer system 104 over a communications network 106, which may be the Internet or other suitable communications network. The client computer system 102 accesses the server computer system 104 to utilize the specific software services provided by the server computer system, which may be simply downloading a desired application program or supplying input to an application running on the server computer system to obtain desired data, as will be described in more detail below.

In the example of FIG. 1, the client computer system 102 includes a browser 108 that sends Hypertext Transfer Protocol ("HTTP") requests to the server computer system 104 over the communications network 106. In response to the applied requests, a server engine 110 on the system 104 processes the requests and provides files to the client computer system 102 such as Web pages 112 and client application programs 114. The client application programs 114 are shown as including a number of individual application programs AP1-APN, each of which may be independently selected and transferred to the client computer system 102. The application programs 114 are an example of one type of computer resource that an ASP provider may make available to users, as will be appreciated by those skilled in the art. The Web pages 112 function as the client interface to the ASP server computer system and allow the client computer system 102 to, among other things, select which ones of application programs 114 are to be transferred.

In operation, a user of the client computer system 102 accesses the ASP server computer system 104 and typically provides a request that includes various user information, such as user name, credit information, and which ones of the client application programs 114 the user desires to access. The server engine 110 processes the request, which includes verifying the user's credit, and thereafter transfers the selected application programs 114 to the client computer system 102. The user of the client computer system 102 thereafter utilizes the transferred application programs 114 as desired.

Depending on the type of service been provided by the ASP server computer system 104, the transferred application programs 114 may correspond to either the entire executable application program including all required system files, such as any required dynamic link library files, or may be an application "stub" or module containing only a portion of the application. When the entire executable application program 114 is transferred, the user simply opens this program as he would any other programs stored on the system 102 and need not be connected to the server computer system 104 when using the application program. This situation may be termed a broken-connection mode of operation because the client computer system 102 and server computer system 104 are not communicating when the application program 114 is being run. In contrast, when an application module is transferred to the client computer system 102, upon opening this module the application is initiated and the server computer system 104 is contacted and thereafter communicates with the client computer system to execute the application program. This situation may be termed a continuous-connection mode of operation because the client computer system 102 and server computer system 104 are communicating when the application program 114 is being run.

The user of the client computer system 102 must, of course, pay for the application programs 114 provided by the server computer system 104. Typically, the user pays for the application programs 114 in one of two ways. In the broken-connection situation, a user typically pays as he goes, meaning that the user simply pays for each application program 114 downloaded to the client computer system 102. In the continuous-connection situation, the user typically pays via a subscription agreement, allowing the user to pay a periodic subscription fee and obtain access to the services provided by the ASP server computer system 104. A user is typically assigned a username and password, which the user supplies to gain access to the application programs 114 corresponding to his subscription agreement.

Each of the broken-connection and the continuous-connection situations has drawbacks, both from the user's and ASP's perspectives. When a user downloads an application program 114 to the client computer system 102, the user may thereafter use the program on multiple computer systems and provide copies of the program to other users. While the terms of the license under which the user agrees to use the application program 114 may proscribe such conduct, the user may nonetheless take such action. In the continuous-connection environment, the user must connect to the server computer system 104 to run the selected application program 114, and this connection can dramatically slow the operation of the program, such as when the server computer system 104 has a large number of client computer systems 102 requesting service. Moreover, although a subscription agreement may be limited to a single user and a single machine, a user may provide his password to others, enabling other users to access the computer resources.

There is a need for providing users access to computer resources offered by ASPs that overcomes at least some of the shortcomings of the existing ASP systems.

SUMMARY OF THE INVENTION

According to one aspect of the present invention, a method for providing access to computer resources on a computer system includes generating a token containing encrypted user information including credit, authorization, and authentication information. A request is initiated to open an encrypted computer resource stored on the computer system, and execution of a remote application manager component on the computer system is also initiated. Under the control of the remote application manager component, the token is decrypted and a user of the computer system is authenticated using authentication information stored in the token. Whether the user is authorized to use the requested computer resource using authorization information stored in the token is then verified, as is whether the user has sufficient credit contained in the token to use the requested computer resource using credit information stored in the token. When the user is authenticated, authorized, and has sufficient credit, the requested computer resource is decrypted and opened. Use of the computer resource is then monitored to determine whether the user has sufficient credit to continue using the computer resource. A notification is provided when the monitored usage of the opened computer resource has exceeded the credit. The computer system on which the above method is executed may be a client system.

According to another aspect of the present invention, a server system receives client requests from client computers, such client requests including authorization, authentication, and credit information, and verifies credit information contained in such requests. When the credit of a user is verified, the server system generates the token containing the associated user information. The server system also selects computer resources using information contained in the client requests and encrypts each selected computer resource. The server system transfers to the client system the token and the encrypted selected computer resources along with the remote application manager component. The server system may thereafter update credit information and authorization information in response to client request from the client system, and provide the client system with an updated token and updated selection of computer resources.

DETAILED DESCRIPTION OF THE INVENTION

Figure 2:
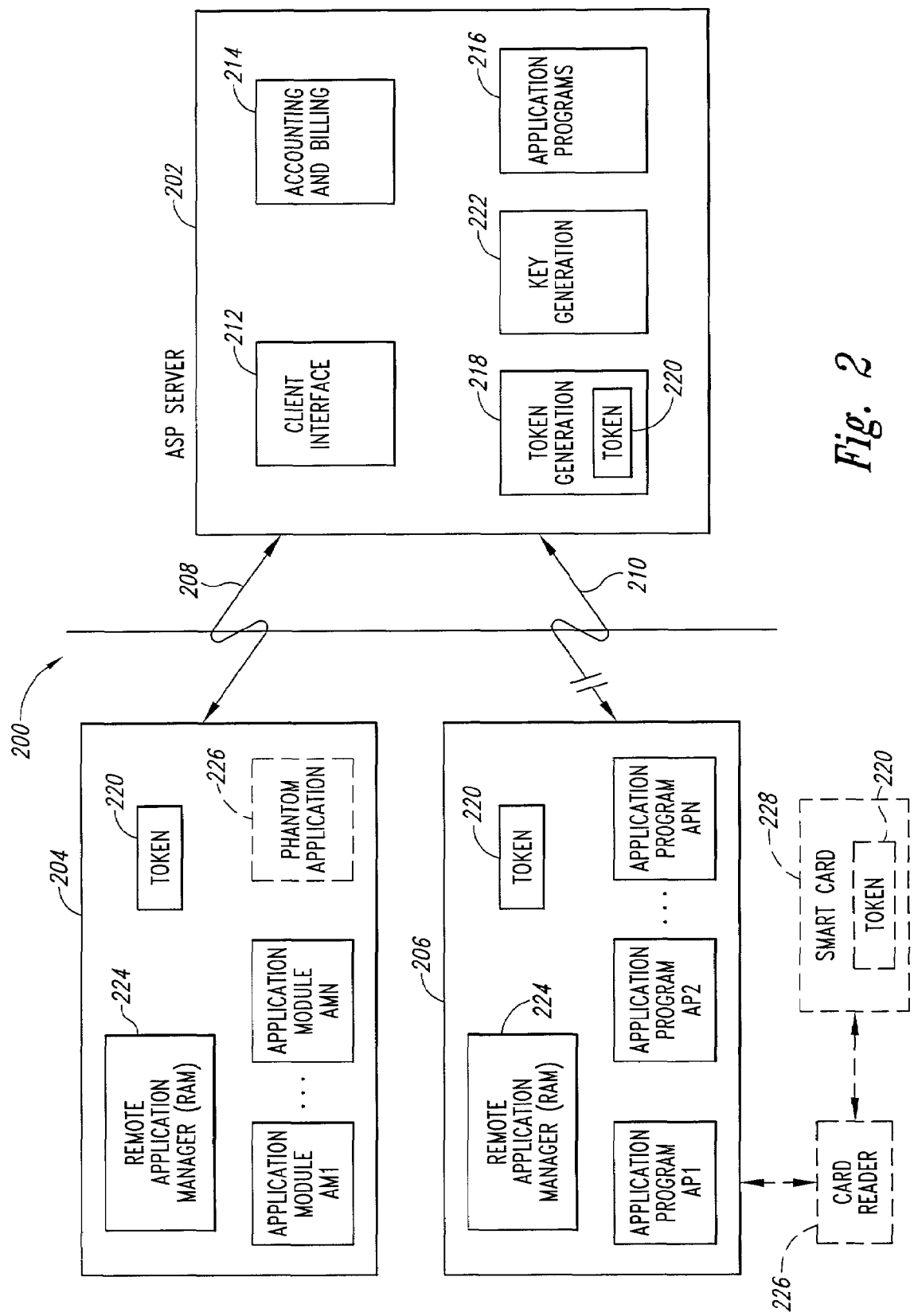
FIG. 2 is a functional block diagram illustrating a client-server system in which an application service provider server supplies services to client systems according to one embodiment of the present invention.

FIG. 2 is a functional block diagram illustrating an ASP system 200 according to one embodiment of the present invention. The ASP system 200 includes an ASP server computer system 202 and client computer systems 204 and 206 that allow an Application Service Provider operating the server computer system to provide computer resources to users in both the broken-connection and continuous-connection environments with reduced concern of unauthorized use and transfer of such computer resources, as will be described in more detail below. In the following description, certain details are set forth to provide a sufficient understanding of the invention. However, it will be clear to one skilled in the art that the invention may be practiced without these particular details. In other instances, well-known components, concepts, and details such as timing and other common software operations have not been shown in detail in order to avoid unnecessarily obscuring the invention.

The client computer systems 204 and 206 communicate with the server computer system 202 over communications links 208 and 210, respectively. The communications links 208 and 210 are illustrated separately to depict a continuous-connection environment via the link 208 and a broken-connection environment via the link 210, and each link corresponds to any of a variety of communications networks, such as the Internet, Local Area Networks, Wide Area Networks, a wireless network using the Wireless Application Protocol, and the like, as will be appreciated by those skilled in the art.

The server computer system 202 includes a client interface component 212 that processes requests received from the client computer systems 204, 206 and communicates with other components on the server computer system to provide the client computer systems with responses to such requests. An accounting and billing component 214 receives credit and billing information from the client interface component 212 and processes such information to verify a user's credit and bill the user for his use of the selected computer resources. A plurality of application programs 216 are stored on the server computer system 202, and correspond to one type of computer resource that may be supplied to the client computer systems 204, 206. The client interface component 212 selects particular ones of application programs 216 in response to corresponding client requests, encrypts the selected application programs, and provides the encrypted application programs to the client computer systems 204, 206. A token generation component 218 receives user information from the client interface component 212 and generates a token 220 using this information, where the token corresponds to a binary file containing encrypted user information, as will be described in more detail below. A key generation component 222 is responsible for generating encryption keys for use by the client interface component 212 in encrypting application programs 216 and the token generation component 218 in encrypting information. The key generation component 222 may utilize any of a variety of encryption methodologies in generating the encryption keys, and in one embodiment utilizes the Public Key encryption methodology to obtain public-private key pairs.

Each of the client computer systems 204 and 206 includes a number of components that have been downloaded from the server computer system 202. The client computer system 204 includes the token 220 and a plurality of application modules AM1-AMN, each application module being an encrypted file corresponding to a selected application program 216 on the server computer system 202. A remote application manager component 224 operates as a supervisory component to decrypt the token 220 and verify that a user is permitted to use a particular application module AM1-AMN, and thereafter decrypts the corresponding application module to enable the user to utilize the application module, as will be discussed in more detail below. The client computer system 204 is also shown as including a phantom application 226, which corresponds to an object which, when opened, initiates execution of corresponding application program stored on the server computer system 202. The phantom application 226 is thus similar to the application modules AM1-AMN except that no portion of the application program is actually stored on the client computer system 204. The client computer system 204 may contain any combination of application modules AM1-AMN and phantom applications 226.

Figure 1:
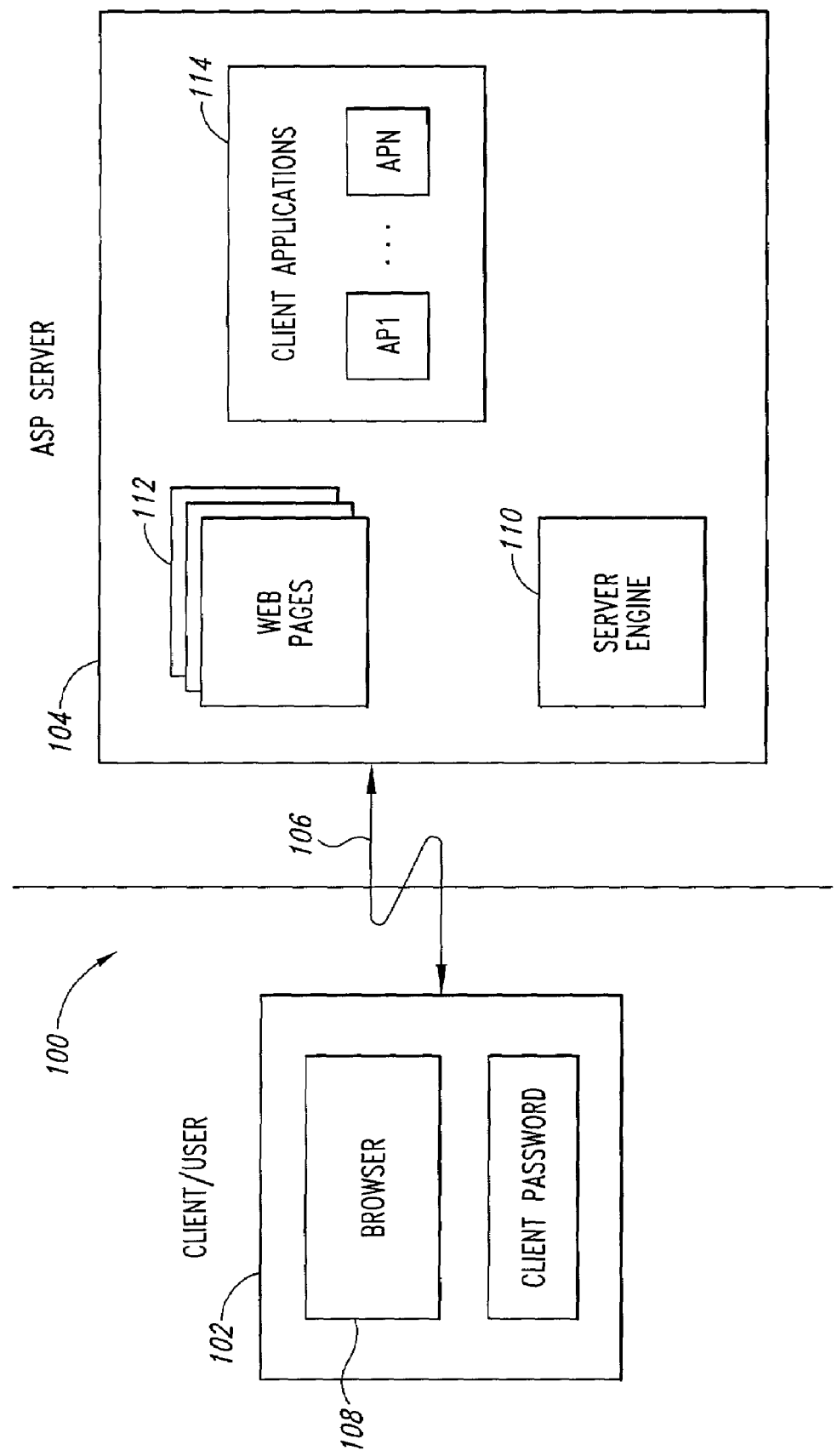
FIG. 1 is a functional block diagram of a conventional client-server system in which an application service provider server supplies services to the client system.

The client computer system 206 also includes the token 220 and remote application manager component 224, along with a plurality of application programs AP1-APN, each application program being an encrypted file corresponding to a selected program 216 on the server computer system 202. Each application program AP1-APN is a complete executable program including any necessary system files, as previously discussed with reference to FIG. 1. The remote application manager component 224 once again operates as a supervisory component to decrypt the token 220 and verify that a user should be permitted to use a particular application program AP1-APN, and thereafter decrypts the corresponding application program to enable the user of the client computer system 206 to utilize the application program.

In one embodiment, the client computer system 206 includes a card reader 226 that is adapted to receive a "smart card" 228 on which the token 220 is stored. The card reader 226 reads the token 220 stored on the smart card 228 and provides the token to the remote application manager component 224. The smart card 228 may be any type of compact card on which the token 220 may be stored, such as a true smart card containing embedded intelligence and memory, a credit card, an ATM card, and the like. The use of the smart card 228 enables a user to utilize multiple client computer systems to access the server computer system 202, and also provides added security in that presumably only the authorized user will be in possession of the smart card. Although the card reader 226 and smart card 228 are shown connected to the client computer system 206, they could also be utilized in the client computer system 204.

Figure 3:
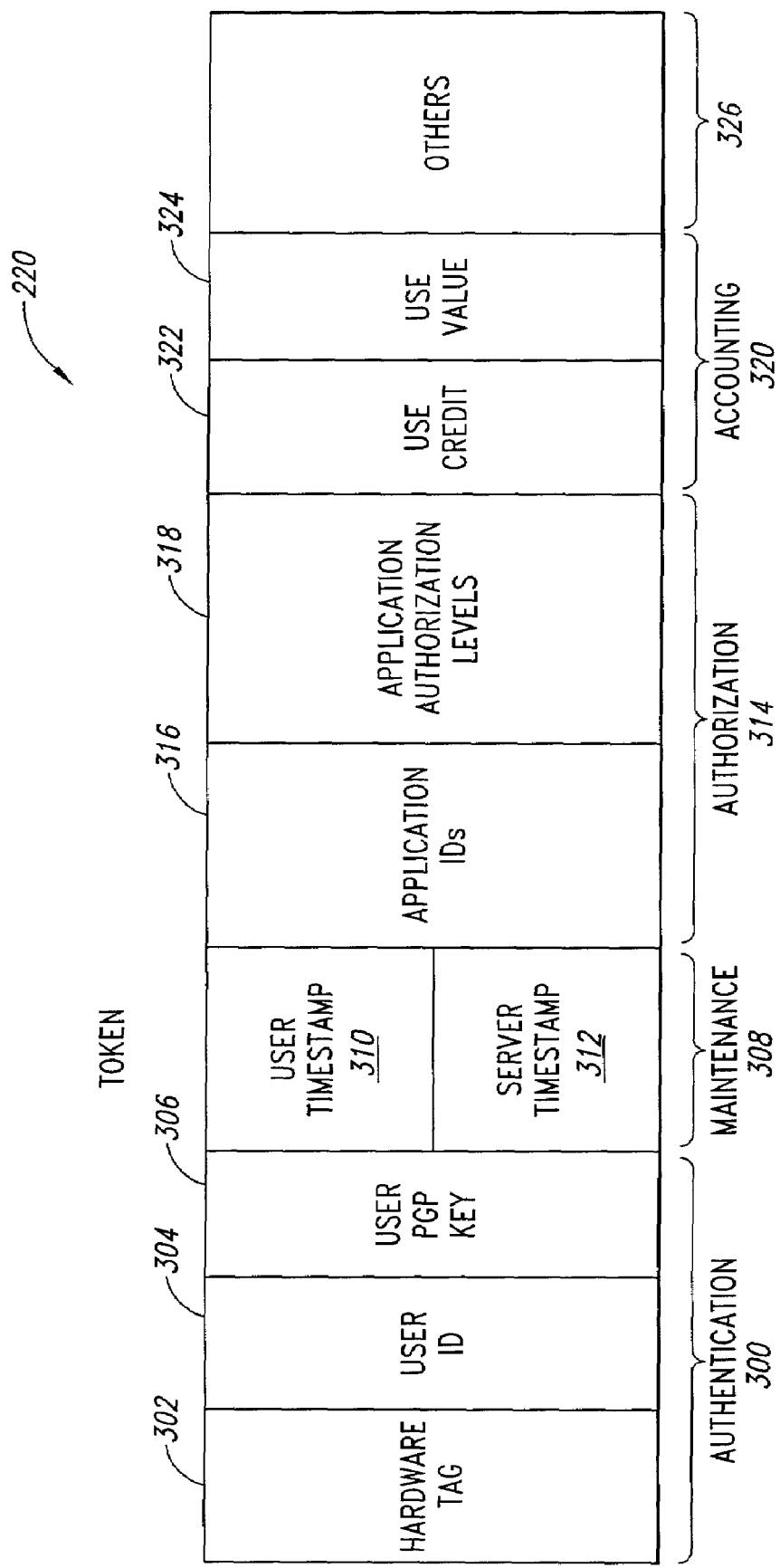
FIG. 3 is a diagram illustrating one embodiment of the token of FIG. 2.

The specific type of user information stored in the token 220 aids in understanding the overall operation of the ASP system 200, and thus, before describing such overall operation, the token 220 will be described in more detail with reference to FIG. 3. FIG. 3 illustrates one embodiment of the token 220 which, as previously mentioned, corresponds to an encrypted binary file containing a variety of user information. In the example of FIG. 3, the user information is stored in a number of fields within the token 220. Starting from the leftmost side of the token 220, the token includes a plurality of authentication fields 300 that are utilized to ensure that only a particular user may access the associated computer resources. As will be understood by those skilled in the art, authentication is a process of identifying an individual to ensure that an individual is who he claims to be, and this is to be distinguished from authorization, which is a process of granting individuals access to specific computer resources based on their identity (i.e., their authentication).

In the embodiment of FIG. 3, the first authentication field 300 is a hardware tag field 302 containing information about the specific client computer system 204, 206 on which the associated computer resources may be utilized. The hardware tag field 302 may, for example, correspond to a processor identification number of the microprocessor running on the client computer system 204, 206. Recall that the token generation component 218 on the server computer system 202 generates the token 220, and thus during initialization appropriate information for generating this tag is transferred from the client computer system 204, 206 to the server computer system. The second authentication field 300 is a user identification field 304 containing information such as a user's name, address, telephone number, and so on, to provide additional information for authenticating the user. The final illustrated authentication field 300 is a user Pretty Good Privacy ("PGP") key 306 that references information contained on the server computer system 202 and in this way provides further user authentication since even if someone were to obtain the information in the fields 302, 304 they should would not typically know the PGP key 306. The PGP technique for encrypting messages is based on the public-key method and will be understood by those skilled in the art.

A maintenance field 308 includes a user timestamp 310 corresponding to the time on the client computer system 204, 206 when the token 220 was generated. A server timestamp 312 stores the time on the server computer system 202 when the token 220 was generated. These timestamps 310, 312 ensure that the duration for which a user accesses a computer resource may be accurately tracked. An authorization field 314 includes an application identification field 316 that includes an application identification number for each application program the user is authorized to use. The application identification number is a unique number associated with each application program, as will be appreciated by those skilled in the art. An application authorization level field 318 stores information regarding particular authorization levels for each authorized application (i.e., each application identification stored in the field 312). Each authorized application may have a number of different authorization levels, and which authorization level a particular user has is stored in the field 318.

An accounting field 320 includes a use credit field 322 containing a value corresponding to the time for which a user may utilize the associated computer resources, and a use value field 324 corresponding to the time for which the user has actually utilized the computer resources. The difference between the fields 322 and 324 yields the time remaining for the user to utilize the computer resources. The fields 322, 324 may contain values corresponding to different ways of measuring a user's use of the computer resources. For example, instead of the duration for which the resource is used, the fields 322, 324 could include integer values, with the field 322 having a value indicating how many times a user is allowed to access the computer resource and the field 324 indicating how many times he has accessed the resource. In this way, the number of times the user may access the computer resource is limited, regardless of how long he accesses the resource each time. Other methods for measuring a user's use of the computer resource may also be utilized, as will be appreciated by those skilled in the art. The token 220 may further include additional fields 326 containing various other information such as error detection and correction fields, as will be understood by those skilled in the art.

The overall operation of the ASP system 200 will now be described in more detail. Initially, the client computer systems 204, 206 contact the server computer system 202 to establish service with the Application Service Provider. In the following example, it is assumed the client computer system 206 has contacted the server computer system 202. The client interface component 212 handles this interface with the client computer system 206, and may, for example, provide Web pages to the client computer systems allowing users to supply billing, credit, and personal information, as well as information about the computer resources the user desires to access, in addition to any other information the server computer system 202 desires to collect. The client interface component 212 thereafter supplies billing and credit information to the accounting in billing component 214 which, in turn, verifies the user's credit and establishes billing records. If the user's credit is declined, the component 214 notifies the client interface component 212, which then notifies the client computer system 206. The component 214 similarly notifies the client interface component 212 when the user's credit is approved, and the following discussion assumes the credit has been approved.

The client interface component 212 supplies the user information to be contained in the token 220 to the token generation component 218, and activates the key generation component 222 to generate an encryption key to be utilized for the client computer system 206 being processed. The token generation component 218 thereafter encrypts the user information received from the client interface component 212 using the encryption key to thereby generate the token 220. The client interface component 212 uses the key to encrypt the application programs 216 corresponding to the selected application programs contained in the supplied user information. At this point, the client interface component 212 transfers the token 220, the encrypted application programs 216 (designated application programs AP1-APN on the client computer system 206), and the remote application manager component 224 to the client computer system 206.

When the user of the client computer system 206 attempts to open one of the transferred application programs AP1-APN, the remote application manager 224 operates in combination with the token 220 and the selected application program to provide the user access to the selected program. The process executed by the remote application manager component 224 will be described in more detail with reference to the flow diagram of FIG. 4. In step 400, the user attempts to open the selected application program AP1-APN, which initiates execution of the remote application manager 224 and the process proceeds immediately to step 402. In step 402, the process determines whether the selected application program is loaded on the client computer system 206. The Application Service Provider may load menus onto the client computer system 206 during the initialization process, and such menus may indicate all application programs AP1-APN provided by the Application Service Provider, regardless of whether the client computer system 206 is authorized to use such programs. When the determination in step 402 is negative, the process goes to step 404, contacts the server computer system 202, and steps the user through a process by which the user may gain access to the selected application program AP1-APN. This process would include the server computer system 202 transferring the encrypted application program to client computer system 206.

Once step 404 is complete or if the determination in step 402 is positive, the process goes to step 406 and decrypts the token 220. The process then goes to step 408 and examines the contents of the decrypted token component 224 to determine whether the selected application is authorized for use. When the determination in step 408 is positive, the process goes immediately to step 410 and decrypts and executes the selected application program. From step 410, the process goes to step 412 and monitors the use of the selected application program. The process then goes to step 414 and determines whether the credit contained in the token 220 has expired. When the determination in step 414 is negative, the process proceeds to step 416 and determines whether the user has indicated a desire to stop running the selected application program. When the determination in step 416 is negative, the process goes back to step 412 and continues executing steps 412 and 414 to monitor the use of the selected application program AP1-APN and ensure that the user has sufficient credit to continue using the program. When the determination in step 416 is positive, indicating the user desires to stop running the selected application program, the process goes immediately to step 418 and the selected application program is once again encrypted along with the token 220. From step 418 the process goes to step 420 and terminates.

When the determination in step 414 is positive, this indicates the user's credit contained in the token 220 has expired and the process goes to step 422 and warns the user to save his work. From step 422, the process goes to step 424 and determines whether the user wishes to continue running the selected application program AP1-APN. When the determination in step 424 is negative, the process goes immediately step 418 and encrypts the selected application program and the token 220, and then goes to step 420 terminates. When the determination in step 424 is positive, the process goes to step 426 and contacts the server computer system 202 to obtain additional credit for the user. Once the server computer system 202 has been contacted, the process goes to step 428 and determines whether the user has sufficient credit. When the process arrives at step 428 in this manner, the inquiry in step 428 is necessarily negative and the process goes immediately step 430. In step 430, the user is presented with a billing screen and provides required information to obtain additional credit.

Figure 4:
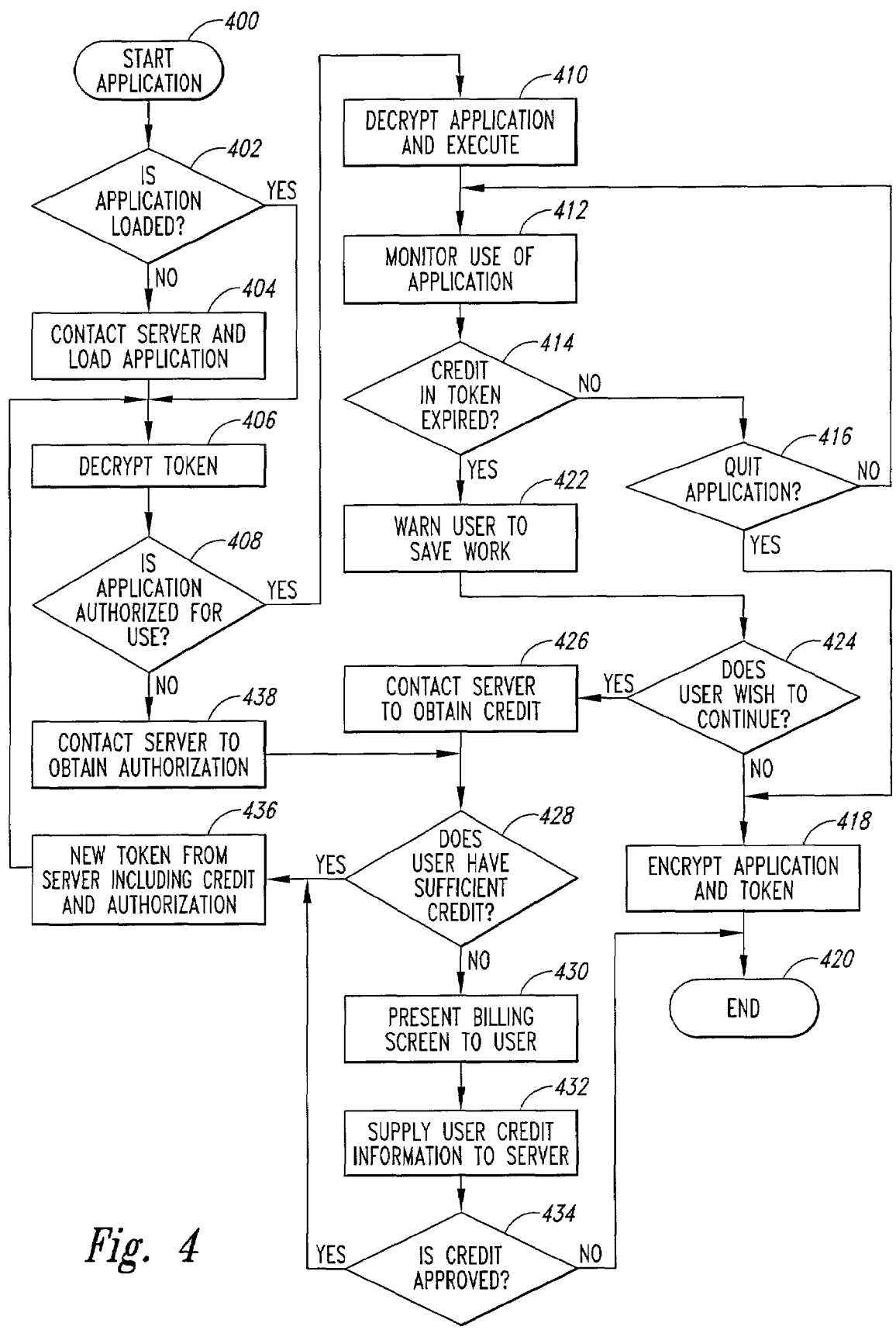
FIG. 4 is a flow diagram illustrating in the operation of the remote application manager component of FIG. 2 in more detail.

From step 430, the process goes to step 432 and supplies the information entered in step 430 to the server computer system 202. From step 432, the process goes to step 434 and determines whether the user's credit has been approved or declined by the server computer system 202. When the determination in step 434 is negative, the users credit has been declined and the process goes immediately to step 420 and terminates. When the determination in step 434 is positive, the user's credit has been approved and the process goes to step 436 and a new token 220 is received from the server computer system 202. The new token 220 contains updated credit information so that the user may access the desired application programs AP1-APN. From step 436, the process goes back to step 406. As indicated in FIG. 4 in step 436, the new token 220 may also included updated authorization information, which occurs when the process arrives at step 436 via a different route, as will now be described in more detail.

Going back to step 408, when the determination in step 408 is negative the selected application program AP1-APN is not authorized for use. As a result, the process goes to step 438 and contacts the server computer system 202 in order to obtain authorization for the selected application program AP1-APN. In step 438, the user will supply any required information to obtain access to the selected application program AP1-APN. From step 438, the process goes to step 428 and determines whether the user has sufficient credit. If the determination in step 428 is positive, the process goes to step 436 and receives a new token from the server computer system 202. It should be noted that when the process arrives at the step 436 via the determination in step 408 being negative and the determination in step 428 being positive, the new token 220 received in step 436 will include only updated authorization information. Conversely, when the process arrives at step 436 via steps 426 and 428, the new token 220 received in step 436 will include only updated credit information. When the process arrives at the step 436 via the step 434, the new token 220 may include both updated credit and authorization information.

With the ASP system 200, an Application Service Provider can provide application programs for certain periods of time in both broken-connection and continuous-connection environments. Moreover, with the system 200 the versions of application programs being run by users may be conveniently updated each time the client computer system 204, 206 contacts the server computer system 202 to obtain additional credit. The system 200 also provides added security for Application Service Providers because unauthorized copies of the application programs may not be made, and users may be limited to a particular client computer system 204, 206 on which they can use the selected application programs. In the embodiment where the token 220 is contained on a smart card 228, each user also realizes added security in preventing unauthorized use of the application programs since the smart card is required to access to such programs.

It is to be understood that even though various embodiments and advantages of the present invention have been set forth in the foregoing description, the above disclosure is illustrative only, and changes may be made in detail, and yet remain within the broad principles of the invention. For example, although the components described above would typically be implemented in software on suitable processing circuitry, where appropriate such components may be also be implemented using either digital or analog circuitry, or a combination of both. Therefore, the present invention is to be limited only by the appended claims.

The invention claimed is:

1. A method for providing access to computer resources on a computer system, comprising:
   under control of a client system,
   providing user information to a server system, the user information including authentication, authorization, and credit information for a user of the client system;
   receiving from the server system, a token including encrypted information generated from the user information provided by the client system;
   a remote application manager component; and
   at least one computer resource, each computer resource being encrypted and the particular computer resources received being determined from the authorization information contained in the provided user information;
   under control of the remote application manager component on the client system,
   decrypting at the client system the token in response to a request to initiate execution of one of the computer resources;
   authenticating the user of the client computer system;
   verifying whether the user is authorized to use the requested computer resource;
   verifying whether the user has sufficient credit contained in the token to use the requested computer resource;
   when the user is authenticated, authorized, and has sufficient credit, decrypting and initiating execution of the requested computer resource; and
   monitoring the usage of the executing computer resource and providing a notification when the monitored usage has exceeded the user's credit.

2. The method of claim 1 wherein the token is stored on a smart card that the remote application module component accesses to retrieve and decrypt the token.

3. The method of claim 1 wherein a request to initiate execution of one of the computer resources comprises clicking on an application icon.

4. The method of claim 1 wherein the token and each computer resource have been encrypted using the public key encryption methodology.

5. The method of claim 1 wherein each computer resource comprises an application module.

6. The method of claim 5 wherein each application module comprises an entire executable application program that is stored in encrypted form on the computer system.

7. The method of claim 1 wherein monitoring the usage of the executing computer resource comprises monitoring how long the user has been using the computer resource.

8. The method of claim 1 wherein providing a notification when the monitored usage of the opened computer resource has exceeded the credit comprises displaying a visual message to the user instructing the user to save his work and indicating his credit has been depleted.

9. A method for providing access to computer resources on a computer system including client and server systems, comprising:
   under control of a client system,
   providing user information to a server system, the user information including authentication, authorization, and credit information for a user of the client system;
   under control of a server system,
   generating a token including encrypted information generated from the user information provided by the client system;
   sending the token to the client system;
   sending a remote application manager component to the client system;
   sending at least one computer resource to the client system, each computer resource that is sent being encrypted;
   under control of the remote application manager component on the client system,
   initiating execution of the remote application manager component in response to a request to initiate execution of the computer resource;
   decrypting at the client system the token and authenticating a user of the client computer system;
   verifying at the client system whether the user is authorized to use the computer resource;

verifying at the client system whether the user has sufficient credit contained in the token to use the computer resource;

when the user is authenticated, authorized, and has sufficient credit, decrypting and initiating execution of the computer resource; and monitoring the usage of the executing computer resource at the client system and providing notification when the monitored usage has exceeded the user's credit.

10. The method of claim 9 wherein the token is stored on a smart card that the remote application module component accesses to retrieve and decrypt the token.

11. The method of claim 9 wherein a request to initiate execution of one of the computer resources comprises clicking on an application icon.

12. The method of claim 9 wherein the token and each computer resource have been encrypted using the public key encryption methodology.

13. The method of claim 9 wherein each computer resource comprises an application module.

14. The method of claim 13 wherein each application module comprises an entire executable application program that is stored in encrypted form on the computer system.

15. The method of claim 9 wherein monitoring the usage of the executing computer resource comprises monitoring how long the user has been using the computer resource.

16. The method of claim 9 wherein providing a notification when the monitored usage of the opened computer resource has exceeded the credit comprises displaying a visual message to the user instructing the user to save his work and indicating his credit has been depleted.

* * * * *